US010323556B2

(12) United States Patent
Saupe et al.

(10) Patent No.: US 10,323,556 B2
(45) Date of Patent: Jun. 18, 2019

(54) ELECTRIC IMMERSION HEATER FOR DIESEL EXHAUST FLUID RESERVOIR

(71) Applicant: GATES CORPORATION, Denver, CO (US)

(72) Inventors: Tim Saupe, Parker, CO (US); Brian Holt, Davison, MI (US)

(73) Assignee: Gates Corporation, Denver, CO (US)

( * ) Notice: Subject to any disclaimer, the term of this patent is extended or adjusted under 35 U.S.C. 154(b) by 171 days.

(21) Appl. No.: 15/381,711

(22) Filed: Dec. 16, 2016

(65) Prior Publication Data
US 2018/0171849 A1    Jun. 21, 2018

(51) Int. Cl.
*F01N 3/20*        (2006.01)
*F01N 3/28*        (2006.01)
(Continued)

(52) U.S. Cl.
CPC .......... *F01N 3/2066* (2013.01); *F01N 3/206* (2013.01); *F01N 3/2896* (2013.01); *H05B 3/00* (2013.01);
(Continued)

(58) Field of Classification Search
CPC ............... F01N 3/2896; F01N 2240/16; F01N 2530/02; F01N 2530/18; F01N 2530/22;
(Continued)

(56) References Cited

U.S. PATENT DOCUMENTS

| 3,623,916 A | 11/1971 | Toyooka et al. |
| 3,657,520 A | 4/1972 | Ragault |

(Continued)

FOREIGN PATENT DOCUMENTS

| DE | 102014208745 A1 | 11/2015 |
| EP | 124691 A2 | 4/1991 |

(Continued)

OTHER PUBLICATIONS

European Patent Office, International Search Report and Written Opinion PCT application No. PCT/US2017/066318, dated Mar. 13, 2018.

(Continued)

*Primary Examiner* — Patrick D Maines
(74) *Attorney, Agent, or Firm* — Paul N. Dunlap, Esq.; Jeffrey A. Thurnau, Esq.

(57) ABSTRACT

An immersion heater including an encapsulated, semi-conductive, heating element. The heating element may be a non-metallic, carbon-based material in the form of a monofilament, a yarn or bundle of semi-conductive fibers which may be twisted, braided fibers or yarns, or the like. The encapsulation may be in the form of a tube of one or more layers of encapsulation material(s) with the heating element inserted therein. Alternately, the heating element may be thermoplastic with semi-conductive carbon additive, and the heating element may be coated with one or more external layers of insulating encapsulation material(s). The encapsulation material may be a rubber or thermoplastic material with sufficient chemical resistance to be immersed in a reservoir of fluid subject to freezing or thickening at low temperatures, such as DEF. The heater may be thermoformed into a predetermined fixed shape.

22 Claims, 2 Drawing Sheets

(51) Int. Cl.
*H05B 3/14* (2006.01)
*H05B 3/18* (2006.01)
*H05B 3/00* (2006.01)

(52) U.S. Cl.
CPC ............... *H05B 3/145* (2013.01); *H05B 3/18* (2013.01); *F01N 2240/16* (2013.01); *F01N 2530/02* (2013.01); *F01N 2530/18* (2013.01); *F01N 2530/22* (2013.01); *F01N 2610/02* (2013.01); *F01N 2610/10* (2013.01); *F01N 2610/107* (2013.01); *F01N 2610/1406* (2013.01); *F01N 2610/1486* (2013.01); *Y02T 10/24* (2013.01)

(58) Field of Classification Search
CPC ............ F01N 2610/02; F01N 2610/10; F01N 2610/107; F01N 2610/1406; F01N 2610/1486; H05B 3/145; H05B 3/18
See application file for complete search history.

(56) References Cited

U.S. PATENT DOCUMENTS

| | | | |
|---|---|---|---|
| 3,943,328 | A | 3/1976 | Cunningham |
| 4,074,222 | A | 2/1978 | Kiyokawa et al. |
| 5,586,214 | A | 12/1996 | Eckman |
| 5,930,459 | A | 7/1999 | Eckman et al. |
| 6,111,234 | A * | 8/2000 | Batliwalla ............... H05B 3/146 219/544 |
| 6,433,317 | B1 | 8/2002 | Arx et al. |
| 6,483,087 | B2 | 11/2002 | Gardner et al. |
| 6,739,126 | B2 | 5/2004 | Huthwohl |
| 7,372,006 | B2 | 5/2008 | Aisenbrey |
| 7,712,304 | B2 | 5/2010 | Mayer et al. |
| 7,912,360 | B2 | 3/2011 | Gschwind |
| 8,559,800 | B2 | 10/2013 | Ellis et al. |
| 8,586,895 | B2 | 11/2013 | Haeberer et al. |
| 8,919,370 | B2 | 12/2014 | Krause et al. |
| 9,032,712 | B2 | 5/2015 | Hodgson et al. |
| 2007/0212036 | A1* | 9/2007 | Halsall ................... F24H 1/202 392/451 |
| 2008/0128663 | A1* | 6/2008 | Chaput ................ H05B 3/0004 252/511 |
| 2010/0095653 | A1 | 4/2010 | Thiagarajan et al. |
| 2010/0206415 | A1* | 8/2010 | Ellis ........................ F16L 53/37 138/33 |
| 2010/0282458 | A1* | 11/2010 | Ann ..................... F24D 13/024 165/185 |
| 2011/0120984 | A1 | 5/2011 | Cook et al. |
| 2013/0125531 | A1 | 5/2013 | Choi |
| 2013/0140018 | A1 | 6/2013 | Invierno |
| 2013/0318950 | A1 | 12/2013 | Gottwald |
| 2015/0101316 | A1* | 4/2015 | Seaton ................... F01N 3/208 60/295 |
| 2017/0122165 | A1* | 5/2017 | Duijsens ................. H05B 3/56 |

FOREIGN PATENT DOCUMENTS

| | | | | |
|---|---|---|---|---|
| EP | 2249617 | A1 * | 11/2010 | ........... F24D 13/024 |
| GB | 1420812 | A | 1/1976 | |
| WO | 2008005829 | A2 | 1/2008 | |
| WO | 2014176585 | A1 | 10/2014 | |

OTHER PUBLICATIONS

The Chemours Company, Viton(TM) Fluorelastomers Selection Guide, 2017.

* cited by examiner

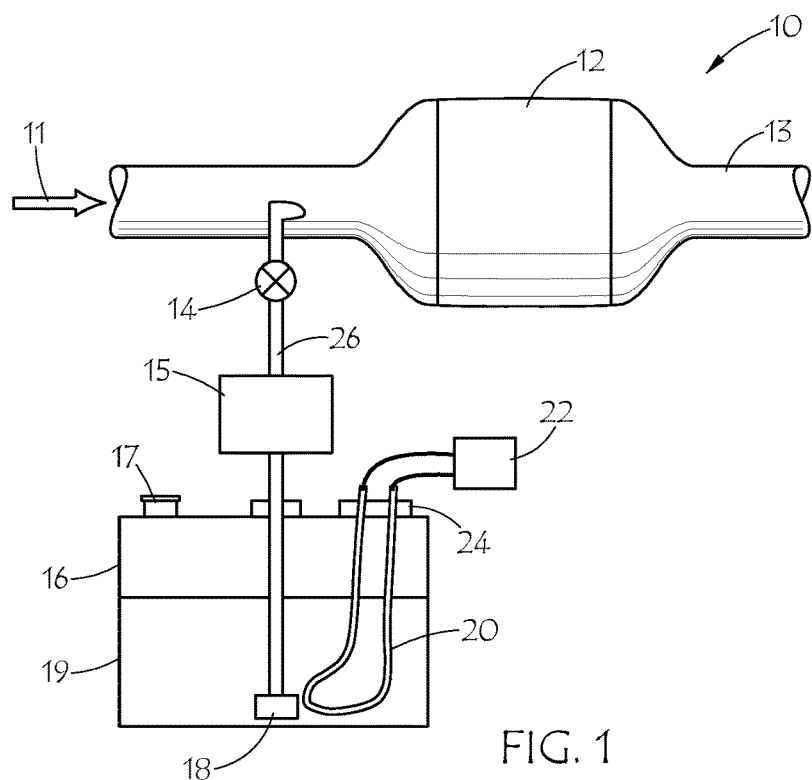
FIG. 1
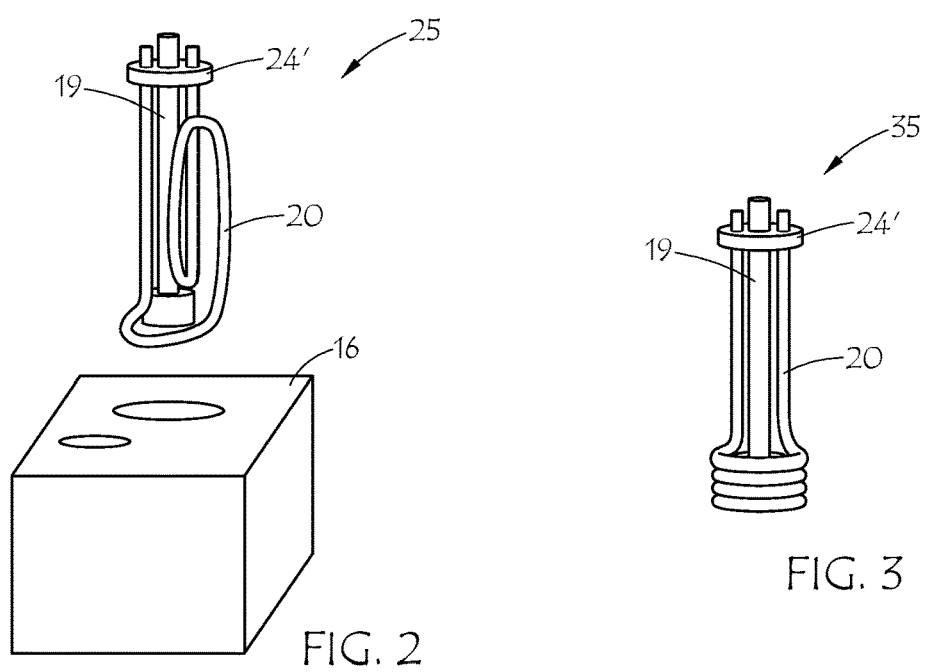
FIG. 2
FIG. 3

ELECTRIC IMMERSION HEATER FOR DIESEL EXHAUST FLUID RESERVOIR

BACKGROUND OF THE INVENTION

This invention relates generally to electric immersion heaters for fluid reservoirs, and more particularly to an immersion heater with carbon-based, semi-conductive heating element encapsulated in a thermoplastic sheath and diesel exhaust fluid storage systems incorporating the immersion heater.

Selective Catalytic Reduction ("SCR") is increasingly used in diesel driven vehicles to meet emissions standards, such as the Euro V or Euro VI standards for road-driven vehicles in Europe, or the EPA Tier IV standards for off-road diesel engines of all sizes used in a wide range of construction, agricultural and industrial equipment in the US. Typically, the SCR vehicle has a urea tank, separate from the fuel tank, which is used to carry an operating fluid such as an automotive urea solution ("AUS") or diesel exhaust fluid ("DEF"), (hereinafter both or either will be referred to as "DEF"). DEF is a 32.5% solution of high purity urea in de-mineralized water. DEF is typically stored in a urea tank of an SCR vehicle and is sprayed into the exhaust gases of the vehicle in order to convert oxides of nitrogen into elementary nitrogen and water.

Problematically, DEF freezes at a temperature of approximately −11° C. (11° F.). In order to ensure this method of reducing emissions in an SCR vehicle remains effective, the DEF needs to be maintained in a liquid state to allow injection.

Thus, in SCR systems, fluid transfer lines and tanks containing DEF must be heated to allow the SCR system to function at temperatures below approximately −11° C. (11° F.). Thawing occurs at a much slower rate in a tank than in a transfer line, because of the greater fluid volume, leading to slow activation of the system. Current SCR systems use engine coolant circulated through a copper coil in the DEF tank to thaw the frozen DEF. The time required to thaw the DEF is determined in part by the time for the engine coolant to warm up after the engine is started, and that is typically the rate-limiting step delaying the startup up of the emissions control system. In addition to lack of temperature control of the coolant, the cost and complexity of the system is increased by the need for coolant lines running to and from the DEF tank.

SUMMARY

The present invention is directed to systems and methods which provide electrical immersion heating for fluid reservoirs, such as for DEF tanks in SCR systems.

Embodiments of the inventive immersion heater utilize an encapsulated, semi-conductive, heating element. The heating element may be in the form of a monofilament, a yarn or bundle of semi-conductive fibers which may be twisted, braided fibers or yarns, or the like, preferably continuous filament carbon fiber or carbon fiber yarn. The heating element may be a semi-conductive thermoplastic material, such as a thermoplastic polymer loaded with conductive carbon black, carbon nanostructures, or carbon fiber. The encapsulation material may be a rubber or thermoplastic material with sufficient chemical resistance to be immersed in a reservoir of fluid subject to freezing or thickening at low temperatures, such as DEF. The encapsulation may be in the form of a tube of one or more layers of encapsulation material(s) with the heating element inserted therein. Alternately, the heating element may be fully impregnated with an impregnation material and/or coated with one or more external layers of encapsulation material(s). The immersion heater may have any desired cross sectional shape, such as round, or obround, or finned. The immersion heater may be thermoformable and arranged into any desired shape, such as linear, bent, coiled, or a complex combination of shapes. The immersion heater is thus stiff or rigid enough to retain such predetermined, fixed shape in use. Preferably the predetermined fixed shape is non-linear, including at least one bend or coiled portion.

In some preferred embodiments, the encapsulation material for the heating element is thermoplastic, which can be extruded and thermoformed. Thus, the invention also relates to a method including extruding a thermoplastic encapsulation material onto a heating element, thermoforming a length of extrudate to a predetermined heater shape, and installing the shaped heater in a reservoir with suitable electrical connections such as to an external power supply or controller. The immersion heater may be made into any convenient or useful shape, to efficiently fit into or accommodate various fluid reservoir configurations for heating the fluid or melting it when frozen. The temperature of the system can be closely controlled by the amount, configuration, and type of semi-conductive fiber or filament used, and by the voltage applied.

In other embodiments, the immersion heater may be formed around, or assembled in combination with, a suction tube for use in a fluid reservoir, such as in a DEF tank in an SCR system.

Embodiments of the invention may result in faster, more efficient heating or thawing of the fluid than prior methods relying on heated engine coolant. By heating DEF using this method, the engine coolant lines to and from the DEF tank in a conventional SCR system may be eliminated.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 1 illustrates an SCR system with a heated DEF tank according to an embodiment of the invention;

FIG. 2 illustrates an alternative arrangement of an immersion heater according to an embodiment of the invention;

FIG. 3 illustrates another alternative arrangement of an immersion heater according to an embodiment of the invention

DETAILED DESCRIPTION

Figure 4:
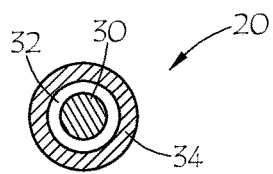
FIG. 4 illustrates a cross section of an encapsulated immersion heater according to an embodiment of the invention.

The present invention is directed to immersion heaters, systems and methods which can be used to heat a fluid in a reservoir or storage tank. The immersion heater is an electrically heated line that may warm the fluid in a tank in which it is immersed, prevent freezing of the fluid, or melt frozen fluid. Embodiments of the immersion heater may use a semi-conductive, resistive heating element housed or encapsulated within a tube or other extruded shape of electrically insulating material. The immersion heater has application, for example, in DEF tanks used in SCR systems for diesel engines.

The immersion heater may utilize an encapsulated carbon fiber, carbon fiber yarn, resistive heating wire, or other resistive heating element. The heater can be immersed in fluid (or frozen fluid) to efficiently heat a fluid or thaw a frozen fluid. The temperature of the system can be closely controlled by the amount and type of carbon fiber or other resistive heating element used, and may result in faster, more efficient thawing of a frozen DEF tank at startup of the engine. The encapsulation of the fiber may be thermoplastic, as in a thermoplastic tube or extruded shape. The thermoplastic may be thermoformed to accommodate various tank configurations.

FIG. 1 illustrates a representative DEF system with a DEF tank heated according to an embodiment of the invention. In FIG. 1, DEF system 10 includes SCR converter 12 processing exhaust gases 11 before expelling them through tail pipe 13. Dosing unit 15 delivers DEF from the DEF tank or reservoir 16 through suction inlet 18 and suction line 19 to DEF injector 14 for injecting into catalytic converter 12. Immersion heater 20 is attached via heater mounting flange 24 and may be electrically connected to heater controller 22. The reservoir 16 may include filler port 17. Delivery line 26 may be a heated line.

Any number of shapes or variations is possible for immersion heater 20, depending on the needs of a given reservoir. FIG. 2 illustrates a variation in which immersion heater 20 and suction line 19 pass through a single mounting flange 24'. Immersion heater 20 in FIG. 2 is also formed with some vertical coils and a lower bent portion to better heat fluid in the vicinity of the suction tube and suction inlet. An assembly 25 may be easier to assemble as well as provide more targeted heating.

FIG. 3 illustrates a second variation of an assembly 35 combining suction tube 19 with immersion heater 20 through a single flange 24'. In FIG. 3, immersion heater 20 has a number of horizontal coils surrounding the suction inlet for targeted heating in that region, as well as two lines running parallel to the suction tube 19. Again a number of alternative arrangements may be conceived. With a thermoformable immersion heater according to the invention, almost any shape may be easily realized.

FIG. 4 illustrates a cross section of an encapsulated immersion heater according to an embodiment of the invention. In FIG. 4, immersion heater 20 includes heating element 30 inside encapsulating material in the form of encapsulating tube 34. The tubular passage 32 may be sized for easy insertion or removal of heating element 30. Passage 32 may be air filled or filled with other fluid as desired.

Figure 5:
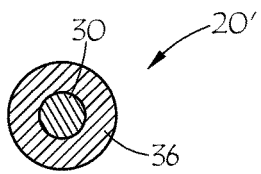
FIG. 5 illustrates a cross section of another embodiment of an encapsulated immersion heater.

FIG. 5 illustrates another embodiment of the encapsulated immersion heater. In FIG. 5, immersion heater 20' includes heating element 30 inside encapsulating material in the form of encapsulating body 36.

Figure 6:
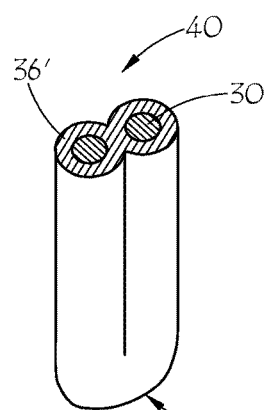
FIG. 6 illustrates a partially fragmented view of another embodiment of an immersion heater.

The immersion heater of either FIG. 4 or FIG. 5 may be shaped or formed as indicated in FIGS. 1-3, as a continuous element with an entry point and exit point at flange 24 or 24', but with any desired or predetermined length or shape for use within reservoir 16. Alternately, the immersion heater could be a single tube or body with two or more heating elements or a heating element and a return or ground wire within a single tube or body. FIG. 6 illustrates immersion heater 40 having continuous heating element 30 encapsulated in a single encapsulating body 36' with heating element 30 entering and exiting body 36' at one end. FIG. 6 shows body 36' having a dumbbell-shaped (or figure-eight) cross section, but it should be understood that any desired cross section could be used, including without limit, for example, round, oval, flat, rectangular, or a complex shape.

Figure 7:
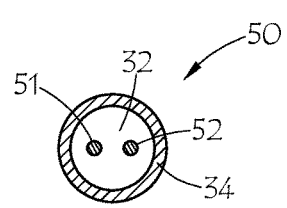
FIG. 7 illustrates a partially fragmented view of yet another embodiment of an immersion heater.

FIG. 7 illustrates immersion heater 50 with heating element 51 encapsulated in a single encapsulating tube 34 with heating element 51 entering the tubular passage 32, and element 52 exiting the tubular passage 32, both at the same end. Element 52 could be the other end of heating element 51 which would turn back on itself near the closed end of the tube, or element 52 could be the end of a return or ground wire attached to the distal end of heating element 51. The two elements 51 and 52 may be electrically insulated from each other.

Figure 8:
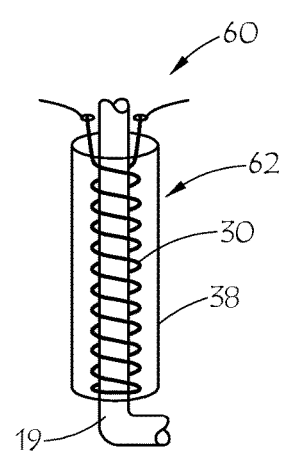
FIG. 8 illustrates an embodiment of an immersion heater in combination with a suction tube.
Figure 9:
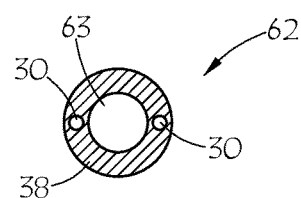
FIG. 9 illustrates a cross section of the immersion heater of FIG. 8.

FIGS. 8 and 9 illustrate another possible embodiment where immersion heater 62 includes heating element 30 arranged in a double helix and encapsulated in annular body 38 with tubular passage 63. A tube or hose or pipe to be heated may be inserted in tubular passage to be heated. In FIG. 8, suction tube 19 is thus inserted through immersion heater 62, forming a heated tube assembly 60.

Figure 10:
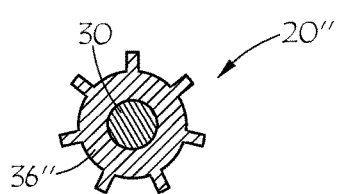
FIG. 10 illustrates a cross section of another embodiment of an encapsulated immersion heater.
Figure 11:
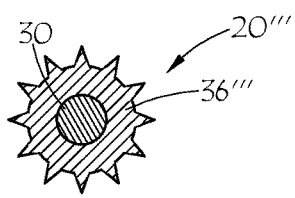
FIG. 11 illustrates a cross section of another embodiment of an encapsulated immersion heater.

FIGS. 10 and 11 show examples of more complex cross-sectional shapes of immersion heaters which may be useful for particular applications. FIG. 10 shows immersion heater 20" with heating element 30 encapsulated by finned body 36" with rectangular-sectioned fins. The fins may provide better heat transfer. FIG. 11 shows immersion heater 20'" with heating element 30 encapsulated by finned body 36'" with triangular-sectioned fins. Any useful shape of fins could be used, including irregularly shaped fins.

Figure 12:
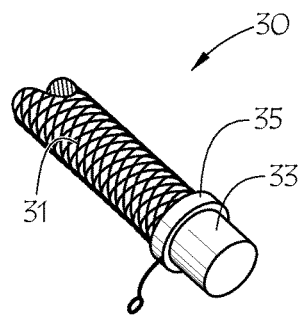
FIG. 12 illustrates a heating element according to an embodiment of the invention.

Embodiments of the inventive immersion heater utilize an encapsulated, semi-conductive-fiber or filament, or other elongated material as the heating element. The heating element may be in the form of a monofilament, a yarn or bundle of semi-conductive fibers, filaments or wires, which may be twisted, braided fibers or yarns, or the like. The semi-conductive resistive filamentous heating element may be composed of a twisted or braided carbon fiber yarn or a bundle of multiple carbon fiber yarns. As non-limiting examples, the carbon fiber yarn may be any appropriate size, such as 1k, 3k, 6k, 12k, and the like, and may be a hybrid of carbon and other fiber such as glass or aramid, for example to enhance adhesion or strength. Preferably, the fibers are non-metal. Preferably, the heating element is completely free of metal or metal-coated fibers or filaments, in order to maintain a sufficient resistivity. The non-metal construction envisioned will be lighter in weight than metallic materials and less prone to corrosion. FIG. 12 illustrates one embodiment of heating element 30 in which continuous carbon fibers 31 (which could yarns or bundles) are braided over a core 33. The core 33 may be thermoplastic or thermoformable material, or simply a flexible material, for shaping into a final form of heater 20 after pulling heating element 30 into encapsulating tube 34 as shown in FIG. 4 or after coating with insulating body 36 as shown in FIG. 5. The core may be a solid elongated body (i.e., not hollow or tubular). FIG. 12 also illustrates use of electrical connector 35 to facilitate coupling of the heating element to an electrical system. Any suitable electrical connection may be used.

In another embodiment, the heating element may be semi-conductive resistive rubber or thermoplastic in the form of a filament, line, tube, or extrudate. The heating element may be based on semi-conductive polymer, or on polymer made semi-conductive by a carbon-based additive, such as carbon black, carbon fiber, or carbon nano-structures. This heating element may incorporate carbon fiber, so-called conductive carbon black, or carbon nanostructures as a semi-conductive filler in a polymer matrix. Carbon nano-structures may include carbon nanotubes either single-wall or multi-wall), graphene, or the like. Carbon fiber may be chopped fibers of uniform length or milled fibers of random lengths. Suitable carbon blacks include N472 (an ASTM designation); Black Pearls® 2000, Vulcan® XC72 and P, and Sterling® C from Cabot Corporation; and grades sold under the trade name Conductex by Columbian Chemicals Company. Multiple carbon-based additives may be combined to achieve a desired level of semi-conductivity. The polymer matrix for the heating element may be of a nylon material, such as nylon 6, nylon 12, nylon 66, nylon 46 or the like. Other useful polymer matrix materials include polyetherketones such as PEEK, polyarylenesulfides such as PPS, polycarbonates, polyesters, polyetherimide, acetal, polypropylene, polyvinylidenefluoride, polysulfone, polytetrafluoroethylene, and other thermoplastics with sufficiently high continuous service temperatures. Preferably the continuous service temperature of the polymer matrix may be greater than or equal to 100° C., ≥120° C., ≥130° C., ≥140° C., or ≥150° C.

The heating element may be fully or partially impregnated, or fully or partially coated with one or more encapsulation materials which may provide protection from abrasion or environmental conditions, improved durability, electrical insulation, or other desired function.

The encapsulation material for the heating element may be a rubber or thermoplastic material with sufficient chemical resistance to be immersed in a reservoir of fluid subject to freezing or thickening at low temperatures, such as DEF. The encapsulation may be in the form of a tube made up of one or more layers of encapsulation material(s) with the heating element inserted therein. The heating element may be inserted into an encapsulating tube or hose suitable for immersion in the desired fluid and suitable for shaping into the desired configuration (as illustrated in FIGS. 4 and 7). The encapsulating tube can be constructed from thermoplastic tubing. The melting point of the thermoplastic is preferably above the designed maximum temperature of the heating element. The tubing may be of a nylon material, such as nylon 6, nylon 12, nylon 66, nylon 46 or the like. Other useful encapsulating materials include polyetherketones such as PEEK, polyarylenesulfides such as PPS, polycarbonates, polyesters, polyetherimide, acetal, polypropylene, polyvinylidenefluoride, polysulfone, polytetrafluoroethylene, and other thermoplastics with sufficiently high continuous service temperatures. Preferably the continuous service temperature may be greater than or equal to 100° C., ≥120° C., ≥130° C., ≥140° C., or ≥150° C.

Alternately, the heating element may be directly coated with one or more layers of the encapsulating material, in which case it is herein referred to as an encapsulating body or sheath. If the heating element includes fibers, filaments or wires, they may be partially or fully impregnated with an impregnation material, which may be the same material as the encapsulating body. The heating element may be coated with one or more external layers of encapsulation material(s). In some embodiments, the encapsulation material for the heating element is thermoplastic, which can be extruded and thermoformed. The encapsulating body may be of a nylon material, such as nylon 6, nylon 12, nylon 66, nylon 46, polypropylene, or any of the aforementioned useful encapsulating materials for the tube or the polymer matrix.

The encapsulating material or the polymer matrix material, whether thermoplastic or rubber, may include without limitation, known compounding ingredients such as extending fillers, reinforcing fillers, plasticizers, adhesion promoters, impact modifiers, process aids, antidegradants, curatives, or the like. Preferably, the encapsulating material may be heat conductive, but preferably not electrically conductive. It should be noted that the heating element is not in a metal sheath. Neither does the encapsulating material comprise a metal sheath.

The resulting immersion heater, because of the electrical resistance of the heating element, will heat up when a voltage is applied across it, i.e., when it is part of the electrical path of a heating circuit. The electrical path may be end-to-end. i.e., from one end to the other end of the immersion heater, or there may be a return wire also encapsulated for a single-ended immersion heater. When a voltage source or power supply is connected to the heating element in the tube or body, electricity will flow through the heating element to ground, resulting in a heating line that can be immersed in contact with a fluid. The heat that is produced in the encapsulating tube or body will warm the tank fluid, thawing frozen fluid or lowering the viscosity of the fluid, thus allowing it to flow as needed by the application. Advantageously, the present immersion heating system affords an ability to tailor the resistance per foot at assembly to meet heating requirements needed for individual heater lengths. By using semi-conductive heating element materials with different resistance levels, such as may be expressed in ohms per foot, one may lower the resistance per foot or the overall resistance for a longer length assembly. With any of the heating elements described herein, such as the braided carbon fiber or the chopped carbon filled thermoplastic, the resistance may be tuned for a given vehicle system voltage (e.g. 12V, 24V, or 48V) and for a desired heating rate.

The heating element may advantageously have an overall resistance of up to 50 ohms, or approximately 1 to 40 ohms, or a resistance of from 2 to 15 ohms per foot. The electrical connection(s) to the ends of the heating element are not particularly restricted, and the ends and/or connections may also be over-molded, shaped and/or equipped with any suitable connector, coupling, or plug for incorporation into an SCR system or vehicle electrical system. The heater controls may be any known in the art, such as those disclosed in U.S. Pat. No. 9,032,712 B2, or U.S. Pat. Pub. No. 2010/0095653 A1, or the like.

The invention also relates to a method of making the immersion heater including the steps of extruding a thermoplastic encapsulation material onto a heating element, cutting the extrudate to a predetermined length, thermoforming a cut length of extrudate to a predetermined heater shape, and installing the shaped heater in a reservoir. The heater may be connected with suitable electrical connections to an external power supply or controller or vehicle electrical system. The immersion heater may be formed into any convenient or useful shape, to efficiently fit into or accommodate various fluid reservoir configurations for heating the fluid or melting it when frozen. For a single-ended immersion heater, one cut end may be sealed after joining the ends of the encapsulated wires to complete a circuit. The immersion heater may thus be incorporated into a DEF system to heat a DEF reservoir.

To facilitate operation of a system utilizing the semi-conductive immersion heater, it may be advantageous to also warm the couplings, hoses, or tubes associated with the system, such as delivery line 26 in FIG. 1. If the couplings and hoses are not warmed, it may be difficult for fluid to pass through them. The heated fluid conduit, couplings, and systems disclosed in U.S. Pat. No. 8,559,800 B2, titled "Heated Fluid Conduit, End Covers, Systems, and Methods," the contents of which are hereby incorporated herein by reference, may be incorporated into the system for this purpose.

The present invention also relates to a system including the tank heater or immersion heater described herein and one or more additional features of a heated DEF reservoir system or of an SCR system. Such additional features include a DEF reservoir or DEF tank, heated DEF lines, power supply, control electronics, DEF pump, suction tube, suction inlet, DEF injector, and the like.

In accordance with embodiments of the present invention a method for providing a heated fluid reservoir with an electrical immersion heater, might include disposing a semi-conductive material in the body of a tube or extruded body and applying an electrical current to the semi-conductive material, thus heating the tube or extruded body and the fluid in the reservoir in which the heater is immersed. In some embodiments of the present invention, a cover may be disposed over a coupling fitted to an end of the elongated body and/or over an end of a wire coupling the power supply to an end of the elongated body, with the wire passing through an opening in the cover. In some embodiments of the present immersion heaters, systems or methods, the heater may extend through a flange or bulkhead fitting and a cover may be disposed over the flange and/or the fitting as well as over the end a conductor coupling a power supply or controller to an end of the immersion heater, again with the conductor passing through the opening in the cover. Preferably, the cover insulates the coupling retaining heat generated. Also to retain heat, various embodiments may employ an insulating jacket disposed over the ends of the immersion heater.

Since DEF tanks and other heated system components may often be exposed to the elements (i.e. rain and snow), directly or indirectly, during use, the potential exists for moisture to penetrate the heater end and interrupt the electrical connection. The interruption of the heating is not desirable. Thus, it may be advantageous in accordance with the present invention to provide a water proof, or at least "weather proof" cover over the end or ends of the immersion heater that seals moisture from contacting the electrical circuit.

Therefore in accordance with the present invention the ends of the present immersion heater may be covered from moisture, thereby preventing moisture from interrupting heating of the hose. Preferably, such a cover comprises an injection molded plastic that will cover at least the end of the connector and seal against encapsulation material covering the heating element. The molded plastic will also preferably have provisions for sealing around power wires to eliminate moisture from migrating into the electrical connection. Ideally, this sealing of the immersion heater ends will also allow for a complete water submersible heater assembly to be produced.

Thus, in accordance with such embodiments of the present invention an immersion heater might comprise not only an elongated body with a semi-conductive material disposed therein and at least one wire coupling an electrical power supply to the elongated body to provide a voltage across it and an electrical current there through to heat the body, but also an end cover molded over a fitting fitted to an end of the body and over an end of the wire coupling the power supply to an end of the conduit. As discussed above, the electrical power supply may be coupled to each end of the body. Preferably, the end cover insulates the fitting retaining heat provided by the current.

Thereby, a method for providing a fluid reservoir immersion heater having a molded end cover might comprise disposing a semi-conductive material in the elongated body of the immersion heater, molding an end cover at an end of the elongated body, capturing an electrical conductor in contact with the semi-conductive material, and applying an electrical current, through the electrical conductor, across the elongated body, heating the elongated body. As noted above, the semi-conductive material might comprise semi-conductive carbon fiber material and the semi-conductive material might be disposed inside a tube or a hose and/or in an extruded thermoplastic body. The immersion heater may be particularly useful for heating a urea tank to thaw or prevent freezing of DEF. The inventive heater and methods permit all coolant lines to and from the DEF tank in conventional systems to be eliminated. The invention may result in faster, more efficient heating or thawing of the fluid than prior methods relying on heated engine coolant. It should also be understood that the immersion heater can be used for many different applications for heating fluids in storage tanks. Examples of materials that could be heated include hydraulic fluids, urea mixtures for catalytic converters, grease or oil for lubrication lines, and the like.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A diesel exhaust fluid ("DEF") system comprising: a DEF reservoir and an electrical immersion heater incorporated into said reservoir; said immersion heater in the form of an elongated body comprising an electrically semi-conductive, carbon-fiber-based, heating element and a thermoplastic or rubber encapsulation material encapsulating said heating element.

2. The diesel exhaust fluid system of claim 1 wherein said heating element comprises continuous filaments of carbon fibers.

3. The diesel exhaust fluid system of claim 2 wherein the encapsulation material of the heating element is in the form of a tube with the heating element inserted therein.

4. The diesel exhaust fluid system of claim 3 wherein said carbon fibers are braided around a solid, elongated core.

5. The diesel exhaust fluid system of claim 3 wherein the heating element consists of said continuous filaments of carbon fibers.

6. The diesel exhaust fluid system of claim 3 wherein the encapsulation material is an electrically insulating thermoplastic material, and the immersion heater is thermoformed into a predetermined fixed shape.

7. The diesel exhaust fluid system of claim 1 wherein the heating element comprises a thermoplastic with a semi-conductive, metal-free, chopped or milled carbon-fiber additive.

8. The diesel exhaust fluid system of claim 7 wherein the heating element is coated with said encapsulation material.

9. The diesel exhaust fluid system of claim 8 wherein the encapsulation material is an electrically insulating thermoplastic material.

10. The diesel exhaust fluid system of claim 9 wherein the immersion heater is thermoformed into a predetermined fixed shape.

11. An electrical immersion heater comprising: an electrically semi-conductive, carbon-fiber-based, non-metal, heating element and a thermoplastic encapsulation material encapsulating said heating element; said immersion heater in the form of an elongated body thermoformed into a predetermined fixed shape.

12. The electrical immersion heater of claim 11 wherein said heating element comprises continuous filaments of carbon fibers.

13. The electrical immersion heater of claim 12 wherein the encapsulation material of the heating element is in the form of a tube with the heating element inserted therein.

14. The electrical immersion heater of claim 13 wherein the carbon fibers of the heating element are braided about a solid, elongated core.

15. The electrical immersion heater of claim 11 wherein the heating element comprises a thermoplastic with a semi-conductive, metal-free, chopped or milled, carbon-fiber additive.

16. The electrical immersion heater of claim 15 wherein the encapsulation material is an electrically insulating thermoplastic material.

17. A method comprising:
forming an electrically semi-conductive, non-metal, carbon-fiber-based, heating element;
encapsulating said heating element in a thermoplastic or rubber encapsulation material to form an elongated electrical immersion heater; and
incorporating the electrical immersion heater to heat a reservoir in a diesel exhaust fluid system.

18. The method of claim 17 wherein said forming comprises extruding a semi-conductive thermoplastic heating element into an elongated body; and said heating element comprises a thermoplastic material with a metal-free, chopped or milled, carbon-fiber, semi-conductive additive.

19. The method of claim 18 wherein said encapsulating comprises coating said heating element with one or more external layers of said encapsulation material.

20. The method of claim 19 wherein and said encapsulation material is an electrically insulating thermoplastic material, and said method further comprises thermoforming the immersion heater into a predetermined fixed shape.

21. The method of claim 17 wherein said heating element comprises continuous carbon fibers, and said encapsulating comprises inserting said heating element in a tube of said encapsulating material.

22. The method of claim 21 wherein said forming comprises braiding said carbon fibers about a solid, elongated core.

* * * * *